(12) United States Patent
Ahlberg

(10) Patent No.: US 6,405,195 B1
(45) Date of Patent: *Jun. 11, 2002

(54) SYSTEM AND METHOD FOR COLLABORATIVE HOSTED ANALYSIS OF DATA BASES VIA A NETWORK PORTAL

(75) Inventor: Christopher Ahlberg, Boston, MA (US)

(73) Assignee: Spotfire AB, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/536,866

(22) Filed: Mar. 27, 2000

Related U.S. Application Data

(63) Continuation-in-part of application No. 09/479,194, filed on Jan. 7, 2000, which is a continuation-in-part of application No. 08/850,828, filed on May 2, 1997, now Pat. No. 6,014,661.
(60) Provisional application No. 60/019,049, filed on May 6, 1996.

(51) Int. Cl.[7] .............................................. G06F 17/30
(52) U.S. Cl. .............................. 707/4; 707/3; 707/102; 345/700
(58) Field of Search .............................. 707/1–10, 100, 707/101, 102; 705/10, 7; 706/61; 345/326, 700; 709/200

(56) References Cited

U.S. PATENT DOCUMENTS

| | | | | |
|---|---|---|---|---|
| 5,237,498 A | * | 8/1993 | Tenma et al. | 705/30 |
| 5,526,257 A | * | 6/1996 | Lerner | 705/10 |
| 5,584,025 A | * | 12/1996 | Keithley et al. | 707/104 |
| 5,794,209 A | * | 8/1998 | Agrawal et al. | 705/10 |
| 6,070,176 A | * | 5/2000 | Downs et al. | 707/513 |

OTHER PUBLICATIONS

"Exploring Terra Incognita in the Design Space of Query Devices," C. Ahlberg & S. Truvé, Dept. of Computer Science and SSKKII, Chalmers University of Technology, Göteborg, Sweden, Jun. 6, 1995.
"The Alphaslider: A Compact and Rapid Selector," C. Ahlberg & B. Schneiderman, Proceedings, ACM SIGCHI '94, 24–8 Apr. 1994.
"Dynamic Queries for Information Exploration: An Implementation and Evaluation," C. Ahlberg, C. Williamson & B. Schneiderman, ACM SIGCHI '92, May 3–7 1992.

* cited by examiner

*Primary Examiner*—Safet Metjahic
*Assistant Examiner*—Uyen Le
(74) *Attorney, Agent, or Firm*—Jeffrey Slusher

(57) ABSTRACT

Data to be analyzed is transferred from one or more user systems to a host system, which includes an analysis/decision support module. Queries are generated, either automatically by the analysis/decision support module, or by the user, who then submits them to the host system. More than one user may participate in the system, including transferring data to the host. This joint participation includes the option of collaboratively submitting or adjusting queries and viewing the results of the data analysis, either in real time, or asynchronously. Data used as the basis of an analysis may therefore come from different entities, even from data bases that are available publicly via the network, but whose owners are not participants in the collaborative, hosted analysis system according to the invention. The host system thus acts as a network portal through which different users may store and share not only data for analysis, but also the results of such analysis.

6 Claims, 7 Drawing Sheets

SYSTEM AND METHOD FOR COLLABORATIVE HOSTED ANALYSIS OF DATA BASES VIA A NETWORK PORTAL

CROSS-REFERENCE TO RELATED APPLICATIONS

This is a Continuation-in-Part of and claims priority from pending U.S. patent application Ser. No. 09/479,194, filed Jan. 7, 2000 which is a Continuation-in-Part of U.S. patent application Ser. No. 08/850,828 filed on May 2, 1997 now U.S. Pat. No. 6,014,661 which claims benefit of Provisional Application No. 60/019,049 filed May 6, 1996.

BACKGROUND OF THE INVENTION

1. Field of the Invention

This invention relates to a method and system for accessing and automatically analyzing data in one or more data bases and for allowing at least one user to selectively view the results of the data analysis based on interactive queries.

2. Description of the Related Art

At present, when a user wishes to analyze the data in a data base, he faces the tedious task of entering a series of search parameters via a screen of input parameters. At times, the various queries must be linked using Boolean operators, and changing one parameter or operator may often necessitate changing many other less crucial parameters so as to keep them within the logical range of the input data set. Similar difficulties are now also arising when a user or a search engine scans many Internet sites to match certain criteria.

Furthermore, the concept of "analyzing" the data in a data base usually entails determining and examining the strength of relationships between one or more independent data characteristics and the remaining characteristics. This, in turn, leads to an additional difficulty—one must decide what is meant by the "strength" of a relationship how to go about measuring this strength. Often, however, the user does not or cannot know in advance what the best measure is.

One common measure of relational strength is statistical correlation as determined using linear regression techniques. This relieves the user of the responsibility for deciding on a measure, but it also restricts the usefulness of the analysis to data that happens to fit the assumptions inherent in the linear regression technique itself. The relational information provided by linear regression is, for example, often worse than useless for a bi-modal distribution (for example, with many data points at the "high" and "low" ends of a scale, but with few in the "middle") since any relationship indicated will not be valid and may mislead the user.

Another problem with existing data base analysis systems is that they are in general centralized, meaning that the data bases, the query and analysis engine, and the display system are all contained within the same general system, at the same site. This means that a user with a large data set but no powerful analysis engine must first find and install the engine before being able to study the data set. Along with such a standard solution to the problem comes the need to maintain the software. This solution is particularly inefficient when there is no on-going need to analyze the stored data. Moreover, if the user wants to analyze data in a data base not at his own site, but rather in a remote, possibly publicly available data base, then he would either have to hope that the remote site has proper data analysis software, or else he would have to acquire the data set and study it at a site that has the proper software analysis tools. This would be unwieldy at best and possibly impossible if the remote data base is very far away, or is distributed among different sites, or has a data set so large that importation into the user's own analysis system is impractical.

Yet another problem arises where more two or more users wish to be able to share not only data, but also the ability to analyze it, and then perhaps even share the results with still other entities. If only one entity has the ability to analyze the data, then it will be difficult or impossible to allow others to help direct or otherwise participate in the analysis or its results. This makes it hard for different users in a single company to most efficiently develop and share results of analysis of data, especially when the users are at different physical sites. For example, researchers working in a large pharmaceutical corporation, as well as data they collect, are often located at facilities far away from each other.

What is needed is a system that can take an input data set, select suitable (but user-changeable), software-generated query devices, and display the data in a way that allows the user to easily see and interactively explore potential relationships within the data set. The query system should also be dynamic such that it allows a user to select a parameter or data characteristic of interest and then automatically determines the relationship of the selected parameter with the remaining parameters. Moreover, the system should automatically adjusts the display so that the data is presented logically consistently.

The system should preferably make it possible for a user either to analyze remote data sets, or to analyze local data sets without needing to acquire and install specialized analysis software, or both. It should preferably still be possible to analyze local data bases even though they may be installed behind a so-called "firewall."

It should also be not only possible but easy for users even at different locations to be able to access each other's data, and preferably to incorporate even other data into their analysis. Ideally, the participants in the analysis system should not have to be within the same organization; rather, it should be possible for people to collaborate in and share the results of data analysis even in the context of an extended/virtual enterprise, in which the participants may be spread across multiple organizations, and across multiple sites. As just one example, the system should easily accommodate a research project involving a collaboration of research efforts by a pharmaceutical company, a biotechnology company, and a university research institution. It should be possible to readily share not only data, but even the results of the analysis of the data, such as visualizations, reports, computations, etc., preferably even with e-mail notification. This invention makes this possible.

SUMMARY OF THE INVENTION

The invention provides a method and a related system for processing data from at least one data base. The main steps of the method according to the invention are: 1) transferring to a host system, via a network such as the Internet, from at least one participating user system other than the host system, the data from the data base(s); 2) in the host system, analyzing the data from each data base according to an analysis routine and then generating analysis results; 3) in the host system, generating a representation of the analysis results; and 4) transferring the representation of the analysis results via the network for display on at least one participating user system.

In the preferred embodiment of the invention, a memory region is allocated in the host system for each participating user system. Each memory region stores data from each data base transferred via the network from each respective participating user system to the host system. Each memory region may also store at least address information indicating the location of the transferred data within the host system. The address information may include, for example, a network address of at least one external data base that is accessible for downloading from a non-participating computer system that is connected to the network. In this case, each such external data base is accessed by the host system via the network and then downloads the external data base data into a memory of the host system. Even when the data from the data base(s) is transferred from one participating user source system, the representation of the analysis results may be transferred to a the participating user systems other than the participating user source system.

The invention may operate with data base data stored or arranged according to any known data structure. In the preferred embodiment of the invention, however, the data base data is structured into records, each record having one or more fields. Each field contains field data, has a field name and one of a plurality of data types. Given this data structure, a decision support module in the host system according to the invention then automatically selects an initial, adjustable, graphical query device as a function of and adapted to a type and range of the corresponding field data. Each graphical query device is then transferred via the network to at least one participating user system. The host system then senses, via the network, adjustment by the user of each participating user system to which each graphical query device has been transferred of any of the displayed, adjustable, graphical query devices. The host system then updates the representation of the analysis results corresponding to the sensed adjustments of any of the query devices, thereby enabling interactive visualization of the analysis results of the data via the network. At least one of the user systems to which graphical query devices are transferred may be one of the participating user systems other than the source user system.

A log may be maintained, preferably in the user-associated, allocated memory regions, of accesses to the data stored in the respective memory regions. The host system may then notify, via the network, each user whose corresponding data, stored in the respective memory region, is accessed by any other participating user.

The decision support/analysis module in the host system may implement any known data analysis routine. In the case where each data base contains a plurality of records and each record includes a plurality of data fields, however, the decision support module may analyze the data from the data base(s) by automatically detecting a relational structure between the data fields by calculating a respective relevance measure for each of the data fields. The relevance measure is preferably a data type-dependent function indicating a measure of relational closeness to at least one other of the data fields. The host system then generates a graphical representation of the relational structure and transfers this graphical representation via the network for display on at least one participating user system.

Results of the data analysis may be generated and presented in many different forms, such as on-screen visualizations, reports, computations, etc. User systems then communicate with the host system, preferably via a publicly accessible network such as the Internet, or via a proprietary network such as are found within some enterprises, in many cases via a browser. Data stored not only in the user space, but, optionally, even imported from external data bases connected to the network, may then be analyzed in the central host. Users may view the results of the analysis, change parameters, and thus interactively analyze the data, but may optionally do so collaboratively, and either in real time, or asynchronously. Other users may add or remove data from the analysis, or change the viewing parameters, based on the same initial data set; the system then allows them to explore other possible relationships in the data.

DETAILED DESCRIPTION

The invention is well suited for interactive visualization and analysis of data from any type of data base. Just a few of the thousands of possible uses of the invention are the visualization and analysis of financial data, marketing data, demographic data, experimental data, environmental data, logistics data, World-Wide Web log files, manufacturing data, biostatistics, geographic data, and telephone traffic/usage data.

The invention includes a data analysis module or "engine," and various embodiments, each with a different system configuration in which the location of the data analysis engine, of the various user systems, and of the data to be used as the basis for the analysis differ. These are described in turn. The preferred method and system for automatically analyzing data are described first.

Figure 1:
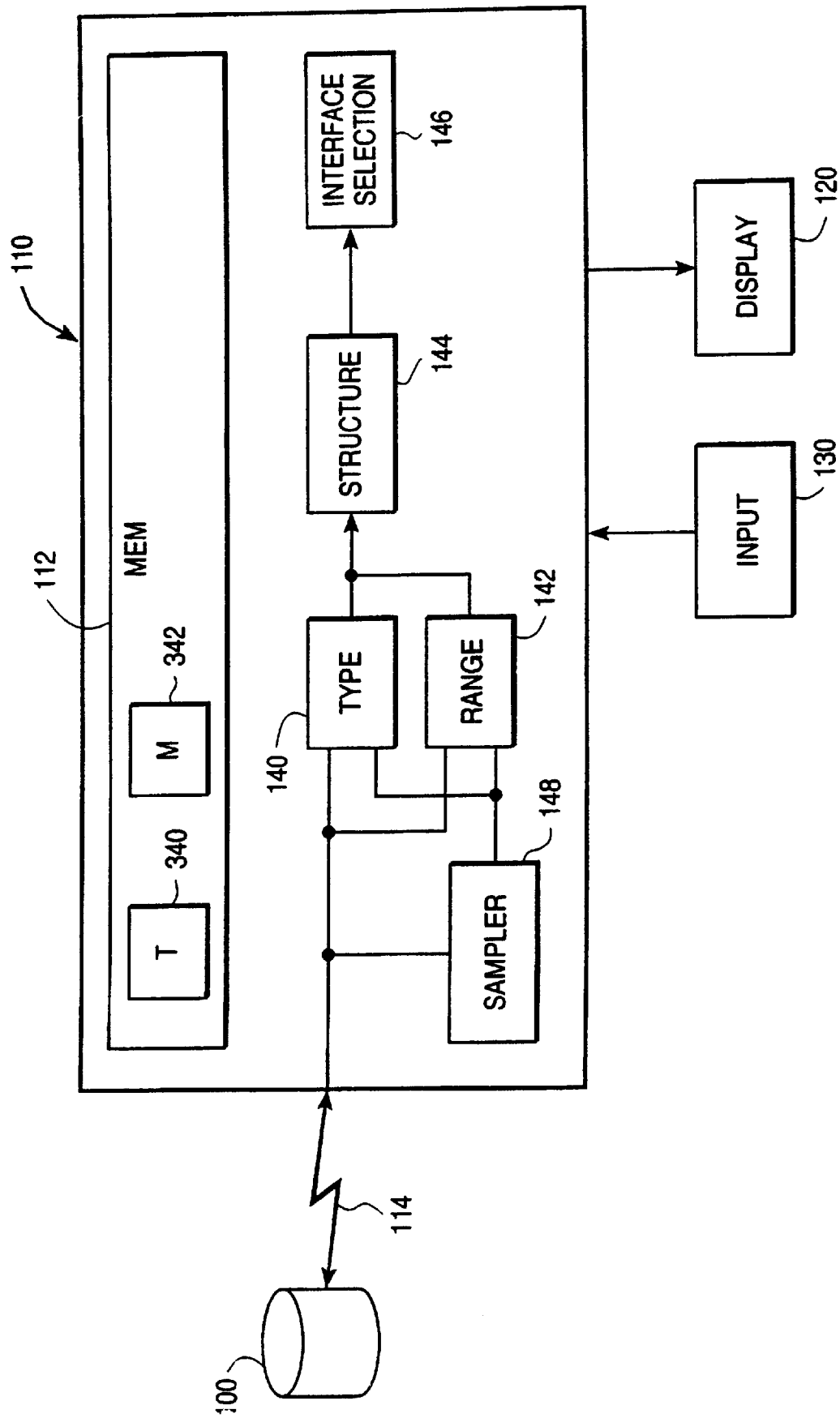
FIG. 1 illustrates the main components of an analysis system according to the invention for retrieving and displaying data from a data base.

The main components of the simplest configuration of the system according to the invention are illustrated in FIG. 1. A data base or data set 100 (one or more) may be stored in any conventional devices such as magnetic or optical disks or tapes and semi-conductor memory devices. The size of the data set may be arbitrary, as the invention has no inherent limitations in the size of the data base it can access and analyze.

A main processing system 110 may be implemented using a microprocessor, a mini- or mainframe computer, or even a plurality of such processors operating in parallel or as a pipeline. The processing configuration may be chosen using normal design techniques based on the size of the largest data set one expects to have to process, and on the required processing times. The processing system 110 includes, among other sub-systems, a sufficiently large memory 112 to store all data used in the data classification and display procedures described below. The processing system 110 forms the analysis system that enables a user to query one or more data bases and view results of the data classification according to the user's queries.

The data set 100 (that is, its storage device) is connected for communication with the main processing system by means of any conventional channel 114, which may be a dedicated channel, or a general-purpose channel such as telephone lines (for example, for connection through a network, including the Internet), fiber-optic or high-bandwidth metal cables, or radio or micro-wave links. The size of the data set and the desired processing speed will in general determine which channel is appropriate and fast enough. The data set need not be remote from the processing system although this is the case in while or in part in some embodiments of the invention, which are described and illustrated below. Rather, the data set's storage device 100 may even be a peripheral memory device connected directly to the processing system 110.

In most applications of the invention, the user will wish to see a graphical display of some feature of the data set. This is not, however, necessary—the invention may be used as a sub-system that queries the data base 100 and organizes the data for a supervisory routine, which then processes the data automatically in some other way. For example, the invention may be used in a system that automatically generates lists of potential customers of a product chosen from a large data base of consumer information. In the typical case, however, the results of the data processing using the invention are to be interactively displayed and to that end, a display unit 120 is preferably connected to the main processing system 110. The display unit may be a standard device such as a computer monitor or other CRT, LCD, plasma or other display screen. Standard display drivers (not shown) are included in the display unit 120 and are connected to the processing system 110 in any conventional manner.

A conventional input system 130 is also connected to the main processing system in the normal case in which the user is to select initial data classification parameters. The input system may consist of a single standard positional input device such as a mouse or a trackball, or an alphanumeric input device such as a keyboard, but will normally include both types of devices. The display unit 120 itself may also form part of the input device 130 by providing it with standard touch-screen technology. The connection and interface circuitry between the input system 130 and display unit 120 on the one hand and the processing system 110 on the other hand may be implemented using standard components and is therefore not described further here.

The main procedural steps carried out by the invention are as follows:

1) The main processing system 110 accesses the data base 100 in any known manner and exchanges standard protocol information. This information will normally include data indicating the size of the stored data set as well as its record and field structure.

2) The processing system then downloads records and classifies them by type (also known as attribute). Some examples of the many different possible types of data include integers, floating-point numbers, alphanumeric characters, and special characters or codes, lists and strings, Boolean codes, times and dates, and so on. In a data base of films, for example, each record may have data concerning the title and the director's name (alphanumeric attribute), the release year (an integer), whether the film is a comedy, drama, documentary, action film, science fiction, etc. (marked in the data base as an integer or alphanumeric code), whether the film won an Academy Award (logical) or how many it won (integer). As is described in greater detail below, the system according to the invention preferably automatically type-classifies the various fields in the data base records. In certain cases, however, the data base itself (in the initial protocol and structural information) may also indicate the types of the various fields of the records; in such case, the processing system may not need to type-classify the fields and can omit this step.

3) For each record set that the processor has classified, it then (or simultaneously) determines the range of the data for each field in the set. This can be done in any of several standard ways, and different methods may be used for different data types. For numerical data sets, the system may simply search through the set to determine the maximum and minimum values as well as (if needed), the average or median values to aid in later centering and scaling of a corresponding displayed query device. The system preferably also counts the number of different values in each set of fields in all of the records in the data set. Ranges may also be predetermined; for example, if the user wishes to include in the data base search data records sorted alphabetically by surnames of Americans or Britons, then the range of first letters will be no greater than A–Z (a range count of 26), although a search of the actual records in the data base might show that the range of, say, A–W is sufficient (with a range count of 23). Names (or other text) in other languages, the alphabetical range and range count may be either greater or smaller; for example, Swedish text could begin on any of 29 different letters (A–Z, Å,Ä,Ö).

4) The system then analyzes the relational structure of the data records using any or all of a plurality of methods. These methods include regression, decision trees, neural networks, fuzzy logic, and so on. According to the invention, the system preferably applies more than one method to determine the structure of the data and then either selects the "best" method in some predetermined sense, or else it presents the results of the different structural determinations to the user, who then may then select one that appears to give the best result.

5) Once the system has determined the data field types and ranges, the system determines a user interface to be displayed on the display unit 120. The results of the structural relational analysis are also preferably used to order the various query devices that are displayed to the user to give him guidance in finding the strongest relationships among the various fields of the data base. The interface preferably automatically selects (at least initially—later, the system automatically presents alternatives to the user, from which he may select) the lay-out of query devices (described below), coordinate axes (either automatically or under user control) and scales, display colors and shapes, the degree of "zoom" of the display (if needed), or other features depending on the particular application and user preferences.

6) In many cases, there will be so many records in the data base that it would take too long for the system to search through all records in the data base to determine the record type or range. The invention therefore preferably includes the procedural steps of first determining the number of records in the data base, and, if the number of records exceeds a predetermined threshold, sampling the data set to determine the record type and to extrapolate its range from the range of the sample. Conventional techniques may be used to determine the number of records and their type; indeed, in many cases, the number of records is a parameter included in the data base itself. The threshold for sampling may also be determined using conventional design criteria and will include such factors as the available time allowed for data transfer and processing, which will in part be determined by the speed of the chosen processor.

Different sampling techniques may be used. For example, every n'th record can be examined (where n is determined by what percentage of the records the system can examine in a given time); or a predetermined percentage of the records can be selected randomly; or records may be sampled randomly until a predetermined statistical significance has been achieved, etc. Once the sampling process has been completed, the entire data set can be downloaded and processed for display using the type and range classifications of the sample.

7) In a remote processing embodiment of the invention, the data to be classified, analyzed, and displayed is located at a local user's site, or in a data base that is accessible via a network such as the Internet, or both, but the data is accessed and processed as above at a remote site.

As FIG. 1 illustrates, the steps of type detection, range determination, structure identification, interface selection and sampling may be carried out in dedicated processing sub-systems 140, 142, 144, 146 and 148, respectively. Note that many of the processing steps described above (for example, type/range determination and interface selection) can be carried out in parallel as well as in series. Assuming the chosen processing configuration is fast enough, however, all of these steps, or any combination of steps, may be carried out by the same processor.

In most conventional systems, data base searches are interactive only in the sense that the user's initial "guess" (search profile) can be modified and re-submitted—the user is given little or no guidance or indication of the size and range of the data involved in the various possible choices for the search profile. As such, the user might, for example, initially submit a search profile with no possible "matches." By initially analyzing the data set to determine data types (attributes) and ranges, the invention is able to create an initial query environment that allows the user to avoid such wastes of time. Even further time-saving procedures unique to the invention are described below.

Figure 2:
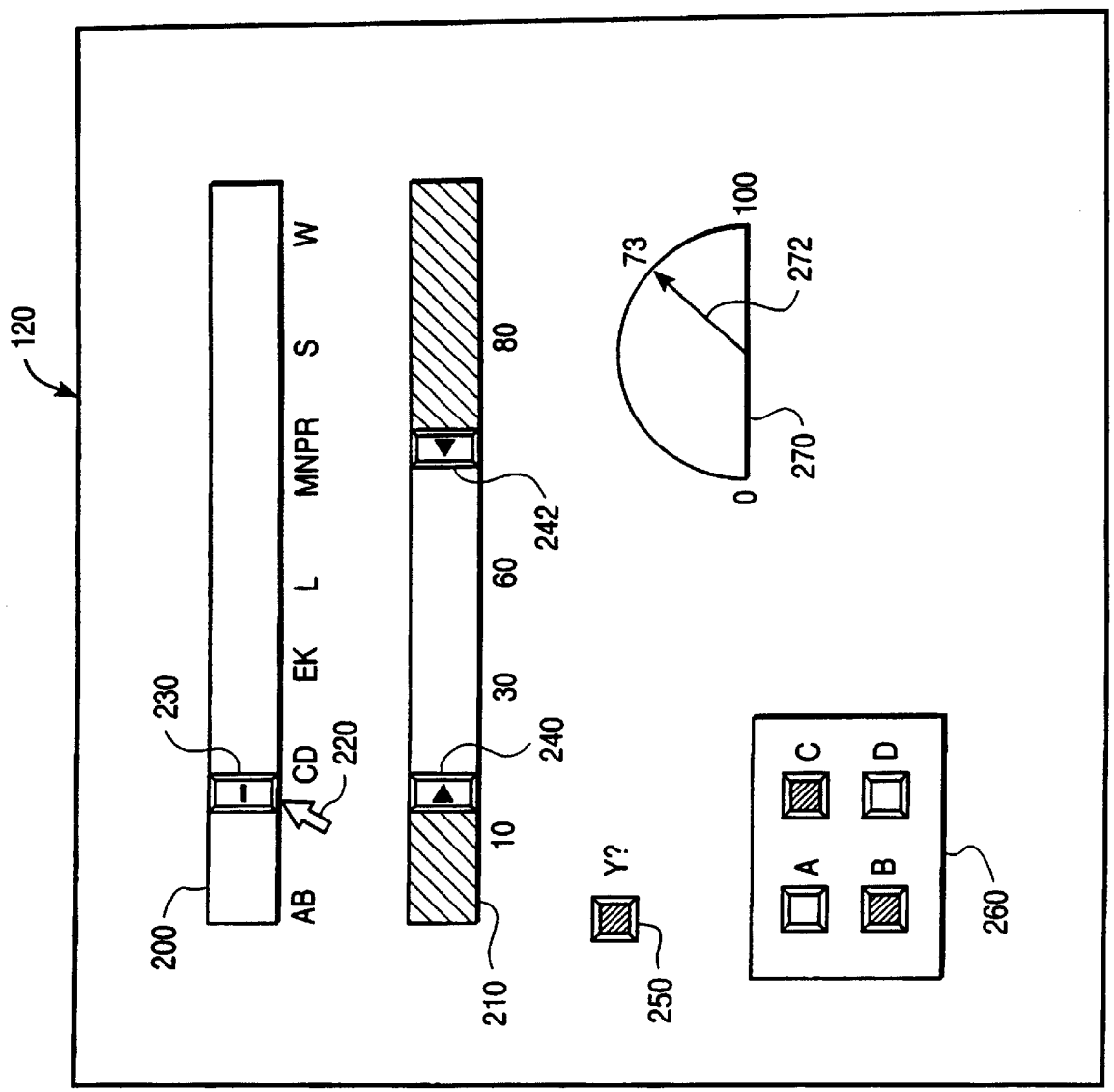
FIG. 2 illustrates examples of device queries that can be used in the invention's interactive display.

FIG. 2 illustrates examples of dynamic query devices that the processing system may generate on the screen of the display unit 120, depending on the type and range of the data. The various data query devices are generated and located for display using any known software, such as is readily available for writing display software for Microsoft Windows applications or similar software packages. One of the most useful query devices is the slider, which may be either a single-slider query device 200 for indicating single alphabetical or numerical characters, or the rangeslider query device 210 for indicating ranges of alphabetical or numerical characters; two-dimensional single and range sliders may also be used.

In FIG. 2, the attribute of the data field associated with the single slider 220 is alphabetical. One sees in this example that the data in the indicated field has relatively very few "A" entries, relatively many "B" entries, few or possibly no "J" entries, many "S" entries, and so on. The user can also see that there are no "X", "Y", or "Z" entries—the upper alphabetical limit "W" will have been determined during the range detection step. In the illustrated example, the user has manipulated a standard screen cursor 220 (for example, using a trackball or mouse included in the input system 130) to move the slider 230 approximately to the right-most range of the "B" entries. In other words, the user is requesting the system to find data records for which the corresponding data set records start with a "B".

The "scale" of the alphaslider need not be alphabetical; rather, instead of the letters "A", "B", . . . , "W" and so on, the system could display numbers, one of which the user is to select by "touching" and moving the slider 230. The user may move the slider 230, for example, by placing the tip of the cursor 220 on it and holding down a standard mouse button while moving the mouse to the left or right, releasing the button when the slider is at the desired value.

The illustrated range slider query device 210 has a scale the same as the single-valued slider, but, as its name indicates, is used to select a range of values. To do so, the user "touches" either the left range slider 240 or the right range slider 242 and moves it as with the slider 230. In the illustrated example, the user has selected a query such that only those relations should be displayed for which the chosen attribute has a value between about 13 and about 72. Excluded values are here displayed "shaded" on the slider query device.

Many variations of the illustrated sliders may be used in the invention, such as those that indicate which values are not to be included (for example, by "clicking" on an appropriate portion of the slider display to indicate by shading that the logical complement of that portion of the range is to be applied), that indicate ranges inclusive at one extreme but exclusive at the other (for example, by clicking on the range marker to toggle it to different logical states), and so on. A more complete discussion of the possibilities is given in the inventors' papers "Exploring Terra Incognita in the Design Space of Query Devices," C. Ahlberg & S Truvé, Dept. of Computer Science and SSKKII, Chalmers University of Technology, Göteborg, Sweden; the article "The Alphaslider: A Compact and Rapid Selector," C. Ahlberg & B. Schneiderman, Proceedings, ACM SIGCHI '94 Apr. 24–8 1994; and "Dynamic Queries for Information Exploration: An Implementation and Evaluation," ACM SIGCHI '92, May 3–7 1992.

The illustrated example also shows a toggle 250 on which the user has "clicked" (for example, in the standard way, by "touching" the toggle with the cursor on the display screen and pressing a mouse button) to indicate that the feature "Y" should be present in the displayed data. That the toggle is "on" may, for example, be indicated by the processing system by displaying it darker, by superimposing a cross ("X") on it, or in some other conventional way.

A checkbox 260 contains more than one toggle. In the illustrated example, features B and C have been selected for inclusion as a data query, whereas A and B have not. A displayed dial 270 is yet another example of a query device. Using the cursor, the user pulls the pointer 272 clockwise or counter-clockwise and the system displays the value (in the example, "73") to which the pointer is currently pointing. Other query devices may be used, for example, pull-down menus and two-dimensional sliders (for example, one on an x-axis and another on a y-axis).

Figure 3:
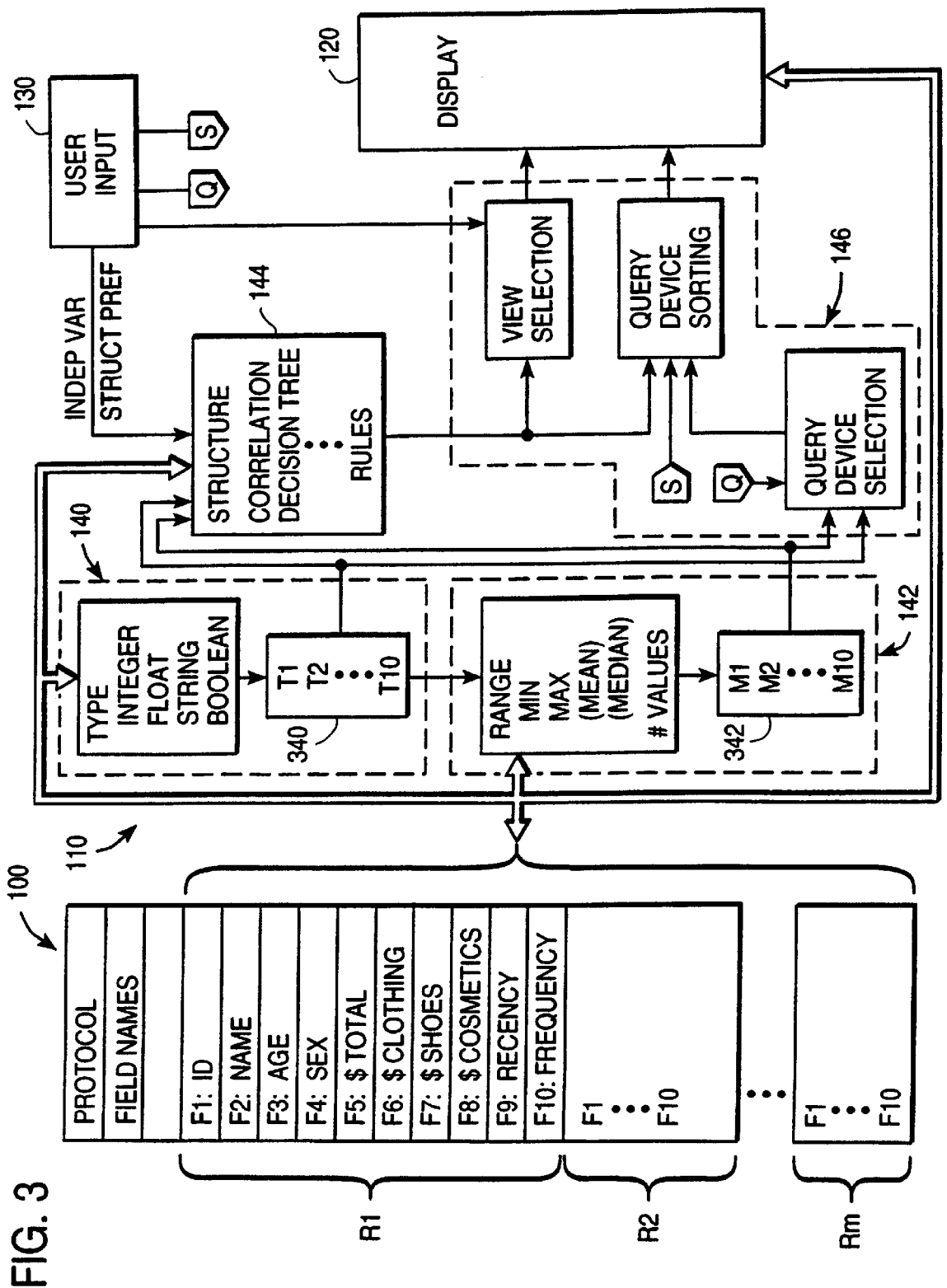
FIG. 3 illustrates the main processing steps the invention follows for one example of the use of the invention to visualize relationships between data in a data base.

FIG. 3 is a block diagram that shows not only the main paths of data flow in the invention, but also is a more detailed functional block diagram of the system shown in FIG. 1. Reference numbers for the functional blocks are the same as those in FIG. 1. Furthermore, the sampling sub-system 148 has been omitted from FIG. 3 since its operation is described above and since it will simply reduce the number of data records initially passed on to the type detection, range detection and possibly the structure detection sub-systems described below.

As is mentioned above, the invention can be used for many different types of data bases and data base structures. Merely by way of example, however, assume that the user wishes to analyze the possible relationships found between various items in a data base of customer purchases for a chain of stores that sell clothing, shoes, and cosmetics. Such data might be compiled automatically, for example, for all customers who use the store's own credit card. This situation is illustrated in FIG. 3.

As is common, the data base 100 is organized as a series of records R1, R2, . . . , Rm, each of which has a number of fields F1, F2, . . . , Fn. In this example, there are ten fields per record (here, n=10 but the number of fields per record in actual data bases may of course be greater or less than ten—the invention is not dependent on any particular number of records or fields). The fields (F1, F2, . . . , F10) in the example are: F1) an identification code for the customer associated with the record; F2), F3) and F4) the customer's name, age and sex, respectively; F5) the total amount the customer has spent (during some predetermined period); F6), F7), and F8) the amount the customer has spent on clothing, shoes and food, respectively, during this period; F9) the date of the customer's most recent purchase; and F10) a number representing how frequently the customer makes purchases (for example, measured in transactions per month).

The illustrated data base also includes standard protocol data as well as field names associated with the different fields. The protocol data will typically include data indicating the total number of bytes (or words) the data base contains, how many records, how many fields per record, and how many bytes (or words) each field consists of. If the protocol is already standardized or otherwise pre-determined between the data base 100 and the main processing system, then there will be no need for the protocol fields. Moreover, the field name data will not be necessary if it is already established in some other conventional manner for the user or the main processing system of the invention what data the various record fields represent.

In the preferred embodiment of the invention, the main processing system 110 automatically detects the type of data in each of the record fields, unless the data types are already specified by the data base in the protocol or field names data. This may be accomplished using any known data type detection routine, as long as the number of records in the data base is large enough to allow the detection routine to make statistically relevant deductions about the data. For example, in order to detect the type of data in field Fk (k=1, 2, . . . , m), the processing system may access (that is, download in bulk, read in and process sequentially, etc.) all of the field data (R1, Fk), (R2, Fk), (Rm, Fk), where (Rj, Fk) indicates the k'th field of the j'th record. Any of many different known tests may then be applied to determine the data type.

For example, if all (or more than a pre-defined percentage) of the bytes of all of the fields Fi (that is, field Fi in all of the records) correspond to binary numbers from 97–122 and 65–90, then the system may assume the field contains data with an alphabetical (string) attribute (type), since these are the ranges of the ASCII codes for the English-language alphabet (upper and lower case, respectively). In the example shown in FIG. 3, this would be the case for F2: Name. If only two different values are detected (especially, 00000000 and 00000001), then the system may, for example, assume that the corresponding field contains Boolean data or; if the two values also fall within the ASCII alphabetical range, then the system may instead (or, temporarily, in addition) mark the field as an alphabetical field. Field F4 might thus be either Boolean (if the Field name is "Woman?" then F4 might indicate either "yes" or "no" with binary numbers 1 and 0) or a single-element string alphabetical ("F" for female, "M" for male). Using known methods, the system will similarly distinguish between integers and floating-point numbers, often by a knowledge of the field structure itself from the protocol data—integers are typically represented by single data words, whereas floating point numbers will typically require two separate data words for the whole-number and decimal portions. Indications of the data types are then preferably stored in the memory 112 as a data type table 340 in the memory 112. In FIG. 3, field Fk has been identified as having data type Tk, (k=1, 2, . . . , n).

For each field, the range detection sub-system 142 determines upper and lower limits. For numerical fields, for example, this will typically be the maximum and minimum values. For string data, however, this will typically be the letters closest to either end of the alphabet. The number of different values is preferably also accumulated for each field. Additional data may also be tabulated as desired or needed. For string data, for example, for each string field, the system might accumulate a separate table of the number of times each letter of the alphabet occurs first in the field in order to reduce clutter in the later display by eliminating non-occurring letters. The median of the occurrence table may then be calculated and used for later centering of the scale of the associated query device (see below). For numerical fields, the range detector 142 may additionally calculate such statistical range data as the mean, median, and standard deviation of the field data. All calculated range data is then preferably stored in a data range table 342 in the memory 112. In FIG. 3, field Fk has been identified as having range data Mk, (k=1, 2, . . . , n).

As is mentioned above, the type- and range-detection sub-systems 140, 142 may operate either in series or in parallel. Even with a single processor implementing both sub-systems, these two sub-systems may operate "simultaneously" in the sense that each operates on a single data value before the next is processed, in order to reduce processing time by having only a single download of the data. For example, the range detector 142 may use each accessed data word as soon as the type detector is finished with it and then use it in the on-going, cumulative calculations of minima, maxima, means, and all other range data for the corresponding field. Once the type detector determines the data type for each field, the range detector can then discard range data calculations that are inappropriate to the detected type. For example, in general there will be no need for a calculation of the median or mean of Boolean or entire strings of data (although, as is mentioned above, there may be for first letters).

Once the type and range of the fields have been determined, the system then automatically determines various relationships between the different data fields. Preferably, several different methods are used, from which the system initially selects a "best" method in a predetermined sense, and also orders query devices in such a way on the display that they indicate to the user which relationships are the strongest. In some applications, the user knows which data characteristic (data field) the relationship determination is to be based on. For example, the user might wonder which type of purchase (clothing, shoes, or cosmetics) seems to be most highly dependent on the age of the customers. In such cases, the user will indicate this to the processing system by entering the independent variable—in the assumed example, "age"—via the input system 130. (The processing system may, for example, display a list of the field names on the display, from which the user can select in any standard way.) The preferred embodiment of the invention is not restricted, however, to beforehand knowledge of which data field is to be the independent variable in order to determine the structure of the data set, although this will in general reduce processing time and memory requirements.

One method of determining the structure of the data set is statistical correlation, either directly, using standard formulas, or in conjunction with determining the regression (especially linear) parameters for any two selected fields of data. For each possible pair of different data fields, the system calculates the statistical correlation and stores the resulting correlation values in a correlation matrix in the memory. The system then identifies the maximum correlation value for each field taken in turn as the independent variable, and orders the remaining variables in order of decreasing correlation. Note that statistical correlation will in general be a meaningful measure only of the relationship between sets of quantitatively ordered data such as numerical field data.

Moreover, if the user indicates which of the m variables (that is, which of the m fields) is to be used as the independent variable before the system begins correlation calculations, then the system need only calculate and order the resulting (m−1) correlation values. If the user does not indicate the independent variable for this or any other structure-determining method, then the system may simply assume each variable to be independent in turn and then calculate correlations with all others; the greatest correlation found can then be presented initially to the user.

Figure 4:
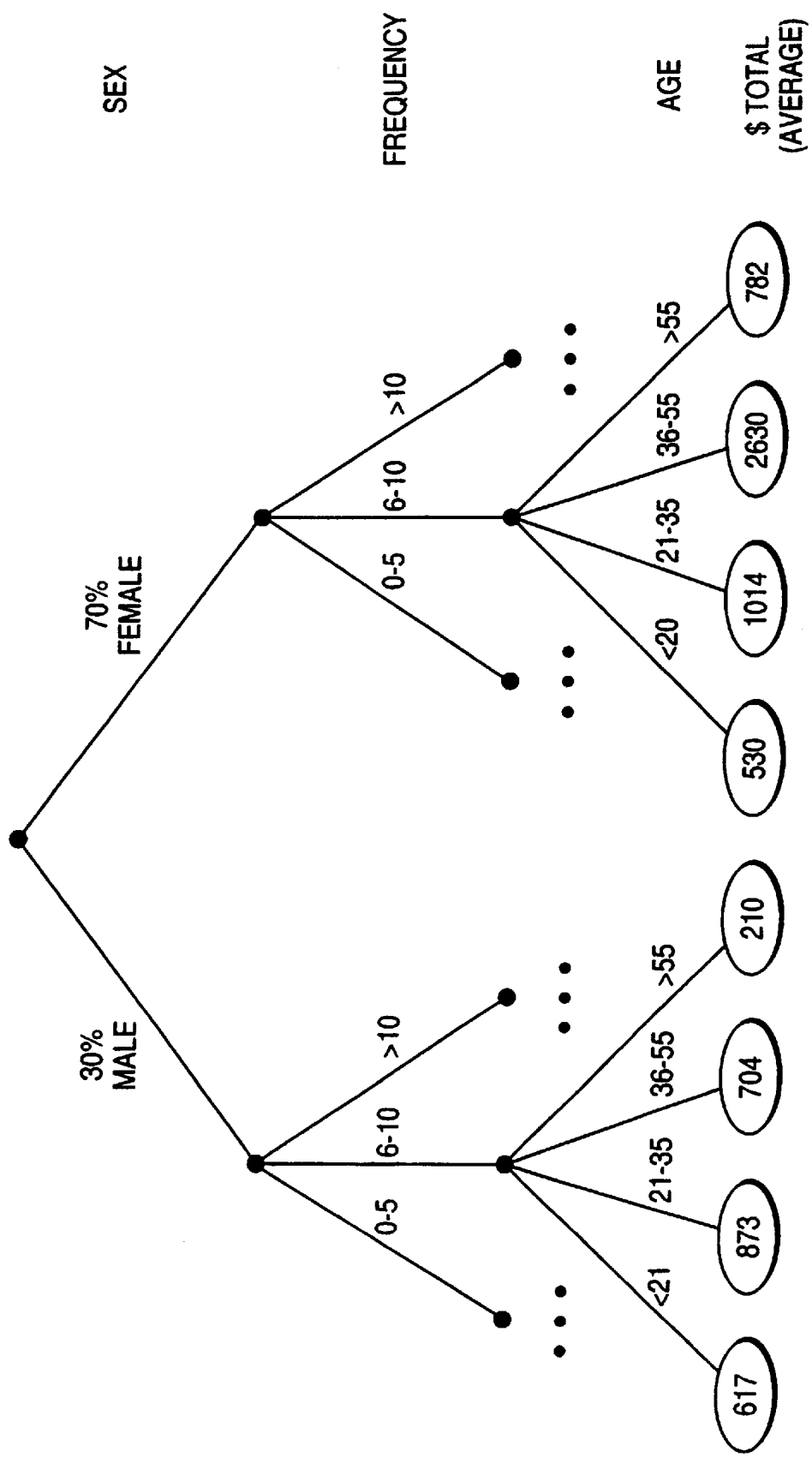
FIG. 4 illustrates a decision tree, which is one method that can be used in the analysis system according to the invention in order to determine and define the structural relationship between different data fields in a data base.

Another method for determining structure is the decision tree, which can be constructed using known methods. See, for example, *Data warehousing: strategies, technologies and techniques*, Ron Mattison, McGraw Hill, 1996. As an example, consider FIG. 4, and assume that the independent variable of interest to the user is F5, that is, total spending. In the illustrated example, the structure sub-system determines that 30% of the data records are for men and 70% correspond to women. Note that this data will preferably already be available in the range data table under entries for number of occurrences of each state of each field. Note also that variable values may be defined as intervals, not only as individual values; thus, solely for the sake of simplicity of explanation, in the illustrated example, frequency data (field F10) is given as one of three intervals: 0–5, 6–10, and more than ten purchases per time period, both for males and for females. For each frequency and for each sex, the data is further branched into age intervals: under 20, 21–35, 36–55, and over 55. (The decision tree will normally continue to branch further in order to include the possibilities for the other fields, but these have been deleted in order to simplify the discussion, with no loss of generality.) The total average spending for each branch is indicated at the tip of the lowermost branch (the independent variable). For example, the total average spending of the group of 36–55 year-old men who purchase 6–10 times per time period is $704.

Given the illustrated tree's ordering of branches, one can see that the highest level of average total spending is for 36–55 year-old women who purchase 6–10 times per period ($2630). By summing "upward" all branches at each level, the system can determine the total average purchases of all men/women whose frequency is 6–10, then for all men/women and then by traversing the tree "downward" the system can pick the path (order of variables) that gives the greatest total average spending, the next greatest, and so on. Note that the decision tree structure is not limited to numerically ordered fields.

In another, straightforward structural description of the data base the system compiles and inspects the distribution of distinct values (or number of values in a plurality of distinct intervals). This may be done either independently or in conjunction with the construction of, for example, a decision tree.

Yet another way to determine the structure of the data base is by using a neural network. The theory and construction of neural networks is well documented and understood and is therefore not discussed in detail here. Of note, however, is that neural networks must in general be "trained" to stabilize on known data sets before they can be used on "actual" data sets. In the context of this invention, the use of a neural network will thus normally depend on some beforehand knowledge of at least the type of data in the data base, so that a suitable set of training data can be compiled and used to train the network. Here, "suitable" means of the same general type, distribution, and with the same general data relationships as those actually presented to the processing system in later use. In many cases this will not be possible; in others, however, it often is, for example, where the data base is numerical and dependent on an underlying set of substantially constant rules or natural laws such as meteorological data.

Assuming some other method is first applied to determine membership functions for the different variables (data fields), fuzzy logic techniques may also be used to measure the strength of relationships among pairs or groups of variables.

Other structure-determining methods include predictive rule-based techniques, which are described, along with still other methods, in *Data warehousing: strategies, technologies and techniques*, Ron Mattison, McGraw Hill, 1996.

Each different method for determining the structure of the data corresponds to a particular measure of what is meant by the "closeness" or "strength" of the relationship between two or more data fields. In many cases, only one of the different structure-determining methods in the sub-system 144 will be suitable for the detected data types. For example, statistical correlation may be the most suitable method if all of the data fields correspond to numerical data, whereas decision trees will normally be more efficient for ordering fields of strings or Boolean data. "Suitable" and "efficient" may be defined and calculated in any predetermined, known sense to determine a validity value indicating the validity of the corresponding measure. Furthermore, in many cases the methods themselves will reveal their own unsuitability. For example, if almost all data field pairs have statistical correlation near zero, then a different method, such as a decision tree, is almost certainly indicated.

Common to all the structure-determining techniques applied by the structure subsystem is that the sub-system determines a measure of relevance for each data field. In some cases, the relevance measure for a given field may be wholly independent of other fields. For example, one straightforward measure of relevance might be a count of how many fields have a certain value, or how many distinct values the field holds. This might be very relevant, for example, in evaluating the sales of some particular product, regardless of other sales.

In other cases, the measure of relevance may be a measure of dependence of some set of dependent, secondary variables (fields) on some base, independent variable (field) selected either automatically or by user input. One method for automatic selection would be to use as the independent field the same field ultimately selected by the user during a previous evaluation of the same or a similar data base or through user input. Another automatic method would be for the system to be connected to an existing expert system, which then selects the independent field. Yet another automatic method would be for the system to determine all possible pairs (or some pre-determined or heuristically determined number of pairs) of fields, then evaluate the relevance measure for each pair, and then order all the results for user evaluation and selection. Statistical correlation (alone, or in conjunction with a linear regression or other curve-fitting routine) is one example of a measure of relevance that is based on a measure of dependence.

Once the system has calculated the relevance measure for each of the fields, then it preferably presents the results to the user by displaying the corresponding field names (or some other identifier) in order (for example, decreasing) of their relevance measures. Where the relevance measure involves dependence of secondary fields on a chosen base field, then the system preferably displays an indication of which field is the base field and in what order the other fields depend on it. The dependent variables are, for example, ordered in terms of decreasing dependence so that the user is given guidance as to which relationships may be of greatest interest. (As is described below, the user can change the order of presentation and the plotted, relationship-visualizing display.)

At any time after the system has determined the type and ranges of the various data fields, the system proceeds with query device selection. Consider once again FIG. 2. In the preferred embodiment of the invention, the initially presented query device will depend primarily on how many different possible values a data field can assume. The thresholds for selecting the different query devices will be predetermined and pre-programmed into the system, but can be changed under user control after initial presentation (for example, by activating a icon of the desired query device and then "dragging" it to the currently displayed query device, by activating and selecting from a pull-down menu adjacent to the currently displayed device, or by using any other known technique for changing portions of a graphical user interface). For example, if the data type if Boolean, a toggle may be predetermined to be the initial query device selected. For string and/or numerical data with fewer than, for example, seven different values, a checkbox or pull-down menu may be the default query device. For fields (variables) with more than some predetermined threshold number of different values, however, the default query device may be a single or range slider, depending on the data type.

More detailed discussion of query device selection is disclosed in the inventors' article (also mentioned above) "Exploring Terra Incognita in the Design Space of Query Devices," C. Ahlberg & S Truvé, Dept. of Computer Science and SSKKII, Chalmers University of Technology, Göteborg, Sweden, which also discusses the scaling of sliders as a function of their range. For example, the lower limit of the data values may be placed at the left end of the slider scale, the upper limit at the right end, the different gradations or value marks (AB .... CD... E.K......L...........MNPR......S..........W) can be displayed adjacent to the slider, and centered on the previously calculated median or average value.

The chosen query devices for the different data field variables are then preferably displayed on the display in the order of dependence on the chosen independent variable. The ordering used is, preferably, at least initially, as determined by the structure-detecting method that calculated the most significant dependence relationship in any pre-defined sense, that is, has the greatest validity value. For example, an indication of the name of the independent variable (that is, its field name) may be displayed in some prominent position on the display screen, and the other query devices are then preferably positioned top-to-bottom, left-to-right, or in some other intuitive way so as to indicate decreasing measured dependence on the independent variable.

Once the query devices are sorted and displayed, the system preferably also displays an initial plot (for example, X-Y, pie chart, bar graph, etc.) of the relationship. The initial type of plot, its scaling, color scheme, marker type, size, and other features—in short, the view selection—are preferably selected in any conventional manner.

Figure 5:
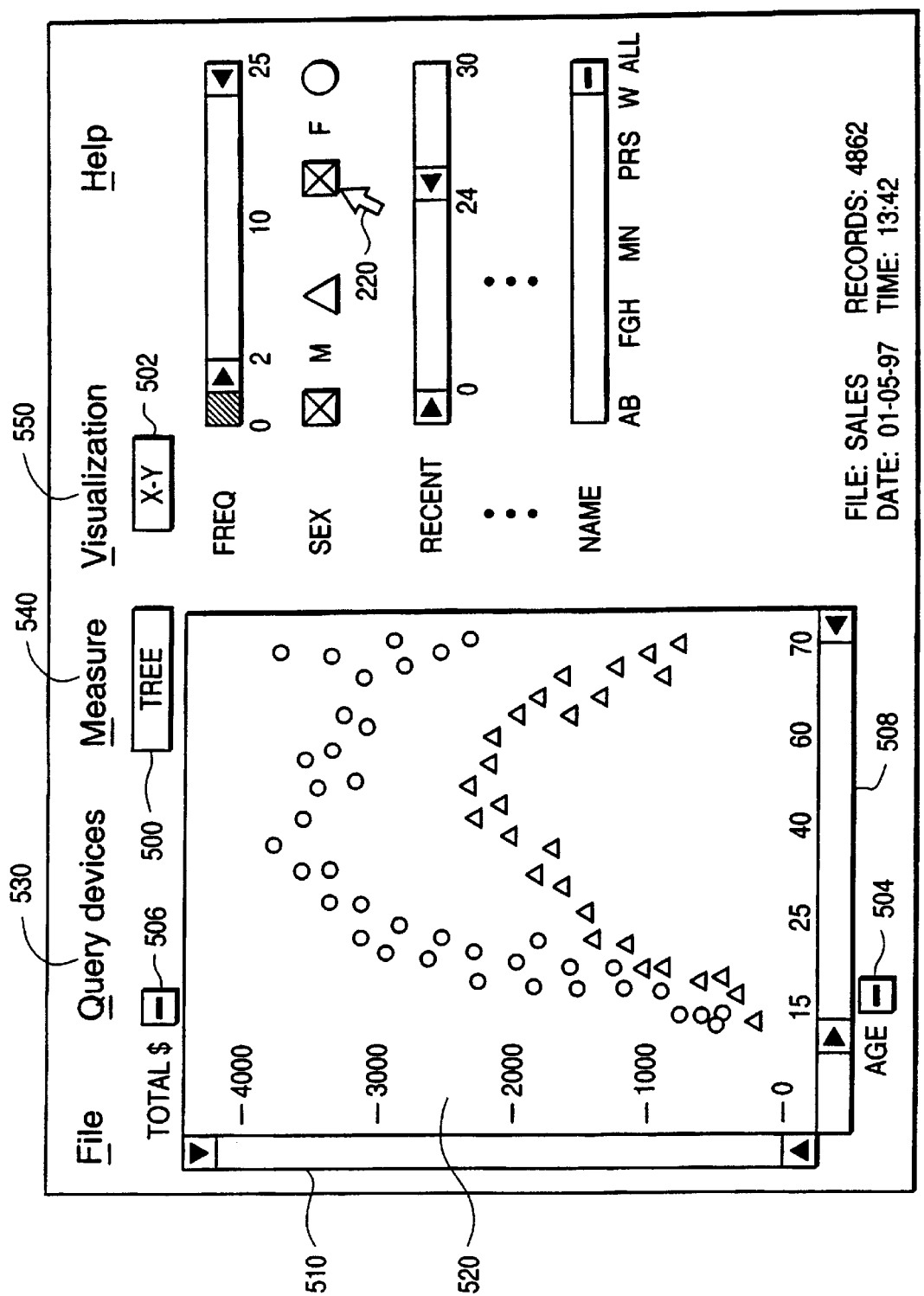
FIG. 5 illustrates a display of the results of a data base analysis using the analysis system according to the invention.

FIG. 5 illustrates a simplified display screen corresponding to one possible set of data processed by the invention using the earlier example of a data base of sales statistics. In the example, the system has determined that the strongest relationship, given the independent variable age, is with purchase frequency, followed by sex, then recency, and so on, which is indicated to the used by displaying the corresponding query devices vertically in descending order. In the example, rangesliders were indicated and automatically selected for the fields "Frequency" and "Recency", whereas toggles were chosen for each of "Male" and "Female," since they can be plotted non-exclusively using different data markers, for example "Δ" and "O". The structure detection method (measure) with the best validity value is displayed in display region 500 as the decision tree ("TREE"). The default plot type is shown in region 502 as an X-Y plot. By activating, for example, conventional pull-down menus such as 530, 540 and 550, the user may direct the system to change the query device for any given field, the measure to be used to determine the order of dependency of the dependent variables (data fields), for the plotting the plot type or color scheme, etc.

Using a pull-down menu, the user had selected "AGE" as the independent variable, and, using a different pull-down menu 506, indicated to the system that TOTAL PURCHASES should be plotted against AGE. Rangesliders 508, 510 are preferably displayed on the respective x- and y-axes to allow the user to adjust (by moving the range markers with the cursor 220) the displayed ranges. In the illustrated example, the system plot only the data for which the frequency lies in the range 2–25, the recency lies in the range 0–24, since the user has moved the range markers of the respective range sliders accordingly.

Using known techniques, the system continually senses the state of all toggles, range and alphasliders, etc. and whenever a change is detected, it re-plots the selected relationship to include only the desired data characteristics. For example, if the user were to "click" on the toggle for "Male" ("M"), so that it is de-selected, then the system would remove the "Δ-marked" data points on the plot 520. As the user changes the settings of other query devices, the system updates the display accordingly to include only the field data that falls within the indicated ranges. This allows the user to view and change the data base presentation interactively, so that there is no break in concentration and exploration of the data base for time-consuming re-submission of conventional queries.

Administrative information such as data set file name, the number of records, and the date and time may also be included on the display screen as desired and as space permits.

Remote Processing Embodiment

Figure 6:
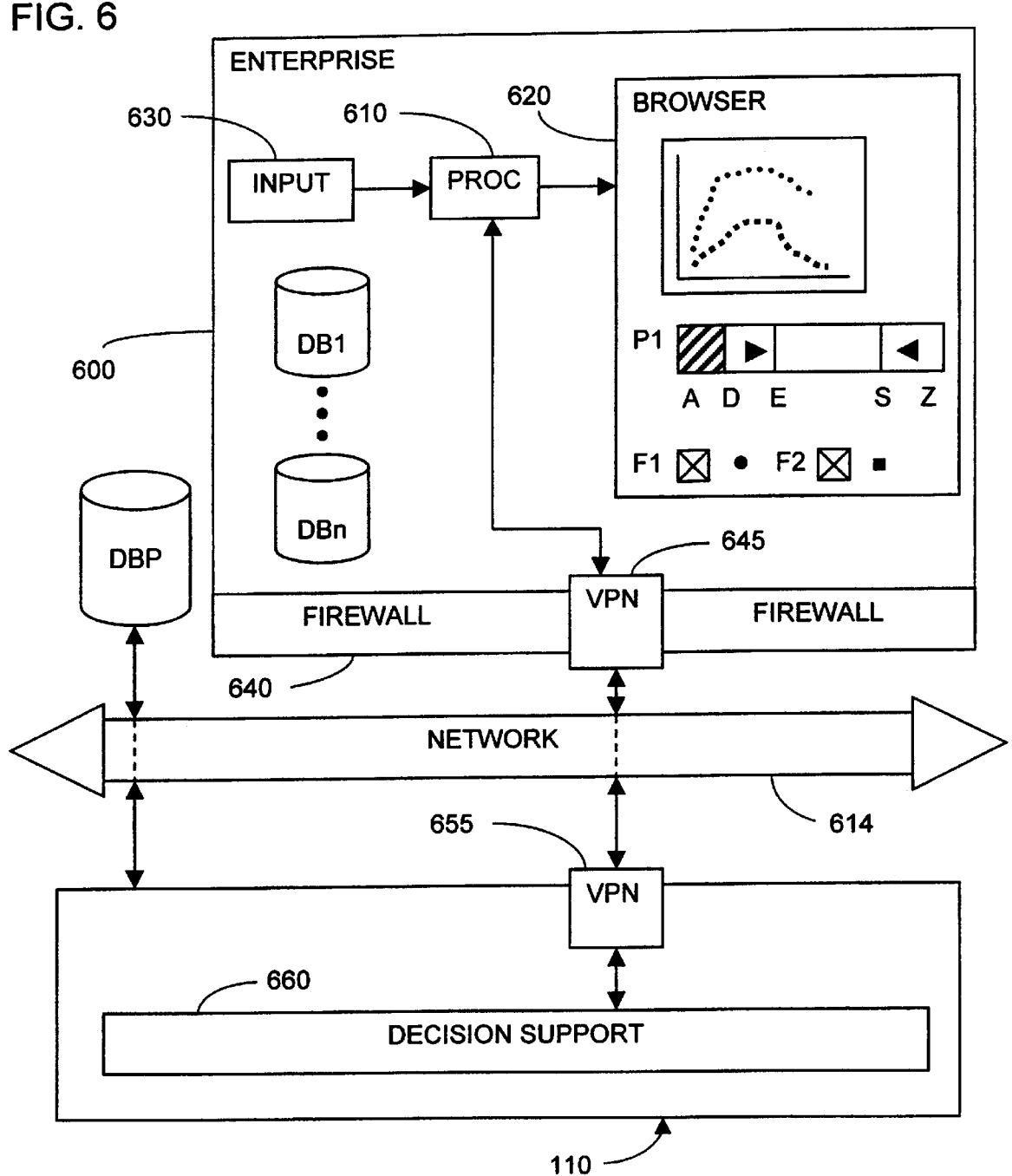
FIG. 6 is a block diagram that illustrates a system according to the invention in which the analysis system is remotely accessible via a network so that it can be used to analyze data in a data base at a user's site, or at a third-party site accessible via the network, or both.

According to a further embodiment of the invention, the input unit 130 and the display 120 are located at a user's site that is remote from the processing system 110 itself. The data base (or several data bases, depending on the application) itself is located either at the user's site, or at one or more third-party sites that are accessible to the processing system. In other words, the data to be analyzed is located locally, that is, at the user's site or at a third-party site designated by the user, or both), as are the devices needed to submit queries and view the results, but the actual processing is carried out remotely, and is accessed via a network. This allows a user who does not locally have the data analysis capability provided by the processing system according to the invention to still have the benefit of it. The general configuration of this embodiment of the invention is illustrated in FIG. 6.

An enterprise 600 (any number of which may be included in the invention) is a local system, that is, located at a user's site, that includes at least one (and often many) local processor or processing system 610, typically a network server, one or more data bases DB1, . . . , DBn, conventional browser software whose results can be viewed on a conventional display 620, and a conventional input device 630. The display 620, which is preferably controlled by a browser or similar software, and input device 630 in this embodiment correspond to and may in fact replace the display and input devices 120, 130 shown in FIG. 1.

In the generalized embodiments of the invention described above (see FIG. 1), the processing system 110, which forms the data analysis system, is connected to one or more data bases 100 via the channel 114. In this remote processing embodiment of the invention, the channel is a conventional data network 614. The network may be internal to the enterprise, such as a standard local area or proprietary network, for example, connecting many different sites of a large corporation. This embodiment of the invention is, however, most useful when the network 614 is a wide-area, publicly accessible network such as the Internet, since it then allows not only for the widest range of users to take advantage of the data categorization, analysis, and visualization capabilities of the processing system according to the invention, but also makes it possible for a user to access, analyze, and visualize data in any data base accessible through the network, that is, even in third-party data bases, as long as they are accessible via the network.

In many corporate enterprise systems, a so-called "firewall" 640 is implemented to isolate the hardware and software components of the system from the public network 114 (such as the Internet) in order to protect the system against corruption (such as from viruses) and intrusion (such as from "hackers") from outside sources also connected to the network. It is usually desirable to allow at least some contact with other entities via the network 614. One way to ensure this without loss of security is to include a well-controlled and monitored portal 645 through the firewall. This connection may be made even more secure by implementing any standard or agreed-upon encryption scheme (for example, any of the widely used "public key infrastructure" PKI schemes) for data transfer to and from the enterprise 600. Other systems communicating with the enterprise 600 will then include similar portals and transfer data using the same encryption standard. The data communication will then be secure and private, even though it is taking place over a (preferably) public network 614. This arrangement is known widely as a "virtual private network" (VPN). This invention also works well with multiple, collaborating sites or entities, any or all of which may exist behind respective firewalls and communicate via the public network, usually via a secure VPN arrangement. Such cooperating, collaborating entities are widely known as an extended or virtual enterprise.

Other enterprises, such as most individuals and small organizations, do not have a firewall, but rather allow direct connections between the individual computers within the organization and the network 614, or between an internal, local network and the public network 614, or both. This remote processing embodiment of invention will work with either arrangement, and the term "enterprise" is used here to denote any such user, whether an individual computer system, or an entity with or without an internal network of several connected computers communicating either independently with the external network 614 or only through a common server, and either with or without firewall protection and with or without a hardware and/or software component providing VPN capability, including extended or virtual enterprises.

The only requirement is that at least one local processing system 610 should be able to connect to the network 614, either directly (using any known technology such as dial-up connections, DSL, satellite, etc.) or indirectly, via one or more intermediary servers, such when using a corporate server and/or a third-party Internet Service Provider (ISP), and should allow data transfer (downloading) via the network.

There are many known techniques by which processors transfer data over a network such as the Internet and either allow access to data bases or to transfer the content of such data bases via the network to other systems such as the processing system 110. In the Internet context, several protocols, such as the File Transfer Protocol (FTP) are standard and well known. Similarly, the techniques used for transferring display-control data, and for inputting and uploading parameters via a text-based or graphical user interface are very well known to any user of, for example, the Internet. For example, the HTML (hyper-text markup language), XML (extended markup language, and Java are commonly used in transfers in order to generate displays, photos, text, and so on, on a computer display connected to the Internet. Any such conventional transfer protocols and languages may be used to implement the various data transfers and display generation in this invention.

In this remote processing embodiment of the invention, the processing system 110 (FIGS. 1 and 3) is hosted remotely, that is, separate from the enterprise 600. In this context, "separate" means that the enterprise 600 is connected to the data analysis system 110 only via the network 614.

As is indicated in FIG. 6, the analysis (data processing) system 110 in this remote processing embodiment of the invention does not require a separate input and display system as shown in FIG. 1, but these devices may of course also be included as needed. The analysis system may itself be provided with a conventional VPN module 655 that corresponds to the portal 645 of the enterprise system. Communication over the network (indicated by the dashed portion of the line connecting VPN 645 and VPN 655) can thus be made secure, using any conventional encryption routine for data transfer between the enterprise system 600 (in particular, the local processor 610) and the remote, hosted data analysis system 110.

In FIG. 6, the module labeled decision support 660 is used to indicate, collectively, the various modules for data typing 140, range determination 142, structural analysis 144, interface selection 146 and, if needed, sampling 148 as shown in FIGS. 1 and 3, as well as the memory 112. In effect, in this remote processing embodiment of the invention, the main processing system 110 remains at a host site, but the data base(s) 100, user input 130 and display 120 functions are localized to the user's site, the connection between the processing system and the data to be processed being the network 614.

It is not necessary for all the data designated for analysis, classification, visualization and display to be located within the enterprise 600. Rather, the invention may also be used to process data in one or more publicly available data bases, one of which is indicated in FIG. 6 as the data base DBP. Note that, in this case, data transfer will in general not be secure, as is illustrated by the direct connection between the decision support module 660 and the network 614. Such data transfer can be carried out using any of the well-known, widely used techniques now available for network file and data transfer.

Any known mechanism may be used to identify the various systems connected to the network 614. Common identifiers for Internet sites include Universal Resource Locators (URL's) and Data Source Names (DSN's). The methods by which one network entity (such as the enterprise 600) addresses another (such as the data analysis system 110) and request and transfer data are well known. Any such method may be used according to the invention.

Assume that a user at the enterprise 600 wants to analyze and visualize data in either internal data bases DB1–DBn, or an external data base DBP that is addressable via the network, or both. The user first submits a request to the network (using conventional methods), for example, using the browser 620 or using some other known software directly through the local processor 610, for access to the data analysis system 110. This may be done, for example, by submitting the URL of the system 110. Once the connection has been established, then the data analysis 110 transmits to the user's browser 620 a standard analysis request screen. The user then identifies for the analysis system 110 the network addresse(s) or similar parameters enabling the data analysis system 110 to address and access the data bases whose data the user wishes to have visualized. The data analysis system 110 then carries out the procedural steps of data analysis described above: 1) accessing the user-identified data base(s) and exchanging standard protocol information (including encryption parameters to establish a VPN, if implemented); 2) downloading records and classifying them by type; 3) determining the range of the data for each field in the set; 4) analyzing the relational structure of the data records; 5) determining a user interface to be displayed on the user's browser 620; and, if needed, 6) sampling the data.

The user may then adjust the interface query devices as displayed on the browser 620 (or analogous monitor display) and submit the adjustments via the browser 620 using any conventional techniques. In FIG. 6, a range slider for a parameter P1 is shown, as are two check boxes for factors F1 and F2 and a hypothetical two-curve display of the results. This is of course just one very simplified example of a possible display. FIG. 5 is another. The data analysis system 110 then in turn regenerates the display in accordance with the adjusted input query devices (which form display parameters).

The data analysis system 110 preferably also includes an repository for various structure-determine algorithms, such as linear regression, curve-fitting, neural networks, etc. The user may then also select which algorithm he prefers for a given data analysis rather than accept the structure algorithm that the analysis system would select automatically as described above. This feature may be needed in certain applications, such as clinical drug trials, in which the measure of relevance is prescribed.

Remote Hosting Embodiment

Figure 7:
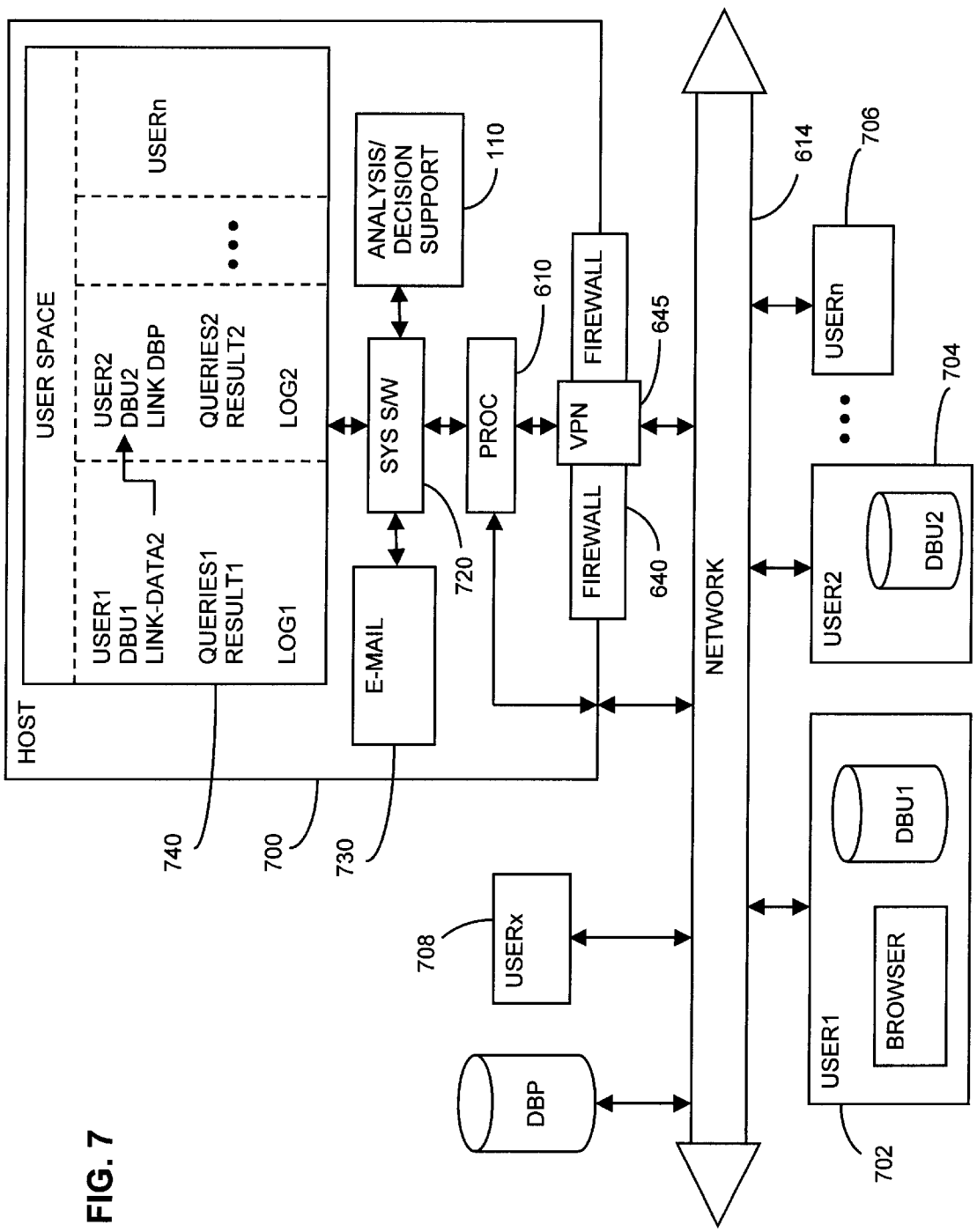
FIG. 7 is a block diagram of a remote-hosting embodiment of the invention, in which the analysis system is centrally hosted and remotely accessible via a network to any number of users. Data to be analyzed is either stored within a user memory space in the central host, or it may be imported via network links, or both.

FIG. 7 illustrates the general configuration of an embodiment of the invention in which a host system 700 is connected via the network 614 to one or more user systems 702, 704, 706, which are also labeled USER1, USER2, . . . , USERn for more ready reference. Merely by way of example, In FIG. 7, features that are identical to those included in previously illustrated embodiments and aspects of the invention have retained the same reference numbers.

In this embodiment, each user system USER1 , . . . USERn, as in earlier embodiments, is assumed to include a standard display capability, some standard input device and, in most cases, both. These are not shown in FIG. 7 merely for the sake of simplicity. As FIG. 7 illustrates, the user systems may, but need not, include or at least be able to access one or more local data bases, for example, DBU1 at the USER1 site, DBU2 and the USER2 site, and so on. Note that any user site may contain any number of data bases, including none at all. Single data bases are shown in FIG. 7 for USER1 and USER2 merely for the purpose of illustration.

Each user who wishes to be able to view the results of a data analysis will also include some conventional display software; those who also wish to be able to adjust query devices and thus interactively explore relationships in the data will also need conventional software that enables on-screen manipulation of the query devices. A conventional browser (such as Internet Explorer or Netscape Navigator) is, as is well known, software suitable for both these tasks—data presentation and query device adjustment—and is therefore preferably included in each user system for each user participating in the collaborative data analysis according to this embodiment of the invention. In FIG. 7, a browser is shown as being included in the USER1 system, but may be assumed to be in other user systems as needed.

In this remote-hosting embodiment of the invention, the host system includes, as in other embodiments, a processor 610 or system of processors, which is connected (via a conventional I/O device such as a modem, IDSN interface, etc.—not shown) to the network 614 either through a firewall, or directly, or both, depending on the configuration preferred in any given implementation. As is explained further below, the host system should be able to receive and store data for analysis, to analyze the data, to communicate the results of the analysis for preferably visual presentation to one or more users. As such, in this embodiment of the invention, the host system serves as a network portal through which users may collaboratively explore data that they themselves have generated through other conventional means, with no need to individually acquire and run data analysis software. Improvement to the data analysis routine can thus be made readily available to all users who participate in the system, simply by updating the software in the host system.

In the preferred embodiment, in which the automatic data analysis and query generation routine described above is implemented, the host system also needs to be able to sense changes by a user to displayed query devices, and to then transmit the correspondingly updated visualization of the data to the user. The host system will therefore in most cases be implemented using a conventional network server, which typically have all necessary hardware and can be programmed using known software techniques to accomplish all these tasks. Another advantage of using a server is that it will typically have enough memory for a large user space, and can handle more than one network access at a time, thus allowing several different, unrelated data analyses, that is data exploration or "data mining" operations, to take place at the same time. Even common standard computer systems, such as "personal computers" will, however, in most cases have sufficient memory and include a modem or other network-connection hardware to handle at least one user who is accessing the data analysis module according to the invention.

As in other computer systems, the host system 700 preferably includes system software 720, such as an operating system, various device drivers, etc., all of which are well-known in the art of computer science. As is also well-known, such system software coordinates, in any known manner, the transfer of information between the host system 700 and the network 614, and it also allocates and administers the memory within the host used by applications such as the data analysis module 110 according to the invention, and an e-mail routine 730 (if included) such as Microsoft Outlook Express.

In this remote-hosting embodiment of the invention, a user space 740 is allocated within the memory, either the system memory, if enough is available, or, preferably, non-volatile storage such as disk memory. This user memory space is then preferably partitioned or allocated into regions in such a way that each user who is participating in the remotely hosted data analysis system according to this embodiment of the invention is allocated a memory region. Each user may then transfer, that is, upload, via the network, either data to be used in an analysis, or network links (such as URL's) to such data, or both. By way of example, in FIG. 7, a memory region has been allocated to each of the users USER1, USER2, . . . , USERn, each of whom is assumed to be a participant in the system. USERx, however, is assumed not to be a participating user, and thus has no allocated memory region in the user space 740.

Methods for accessing a server and for uploading data, for example, using the File Transfer Protocol, into a dedicated memory space of the server are known. For example, web-hosting services use this known uploading procedure to allow users to store the HTML (for example) code for their web sites, as well as data (including images, executable code, etc.) that may be downloaded by those accessing the respective web site.

In general, in this embodiment of the invention, users upload into their respective user spaces the data and links to data that is to be used in the data analysis. The decision support system 110 then accesses and analyzes the data as before, preferably including automatically generating initial query devices, and makes the results available to one or more of the participating users. These results are then transferred in a conventional manner over the network for display on one or more user systems, preferably on their respective browsers. A user may then alter one or more queries as described above, for example by adjusting the respective displayed query devices and submit the adjusted queries back over the network to the host system, whereupon the decision support system 110 regenerates the display according to the updated queries.

FIG. 7 illustrates just a few of the many possible combinations of data that can be presented for analysis to the decision support system 110. In this example, USER1 and USER2 have uploaded the data in data bases DB1 and DB2, respectively, into their respective user memory regions USER1 and USER2. Each user has also uploaded a link: USER1 has uploaded a link (LINK DB2) to the DB2 data stored in the USER2 region, and USER2 has uploaded a link (LINK DBP) to an external data base DBP, which is assumed to be accessible via the network, for example, from a network server. The data that USER1 wishes to be included in the automatic analysis is thus the data in DBUL and DBU2, and the data that USER2 wishes to be analyzed is the data in DBU2 and DBP.

According to this embodiment of the invention, one or more users (user systems) may thus be the source of data for any given analysis, and the results may be made available to any user who is participating in the system, or may be sent by any participating user, for example by e-mail attachment, even to other non-participants. In order to protect the privacy of data uploaded into any user memory region, or otherwise stored and referenced in the host system, conventional password protection may be included to prevent access by unauthorized users. In order to protect the integrity of any data file, moreover, conventional methods may also be employed to restrict it to read-only use.

In some implementations of the invention, each user will be allocated a certain amount of memory in which to upload data. This would be similar to the manner in which web-hosting services assign to each member a certain amount of memory for that member's web site. However, it is possible when using this embodiment of the invention for the amount of data to be analyzed to be very large, possibly exceeding any preset size limit. This situation may be handled in several ways. One way is simply for the user system to request the host system to allocate more memory, at least temporarily. In most cases, any transfer of a data base also first involves transferring information concerning the size of the data base, the number of data sets included, the number of records in each data set, and the number of fields in each record. If any data set exceeds some predetermined threshold, as mentioned above, then the host system could instead direct the user system to transfer only a subset of the data according to a sampling procedure, such as those described above.

Still another way is simply to design the host system to include enough mass storage to handle all the anticipated uploaded data. An estimate of the need may be determined using known methods, and memory may be added as the number of users or the size of the data sets increases. This is, once again, a common problem facing web-hosting systems—as the need grows, more servers are added, as well as more memory capacity.

It is not necessary to store the actual uploaded data sets in the memory regions of the respective users. Rather, all data may be stored in the conventional manner in the memory of the host system; the user memory regions will then contain the address information to the regions of memory where the data is stored in the host system, or the network address of externally located data, such as DBP. Such file allocation systems are well known in the art of computer science. Note that one simple addressing scheme would be to assign each stored data set a network address (such as a URL), once again, analogous to the manner in which web sites are structured and addressed. Addresses pointing within the host system could then be translated to standard file location information using a simple allocation and conversion table. This would enable uniform addressing of all data sets to be used in an analysis, not only by the host system, but also by other users who might want to access the data for analyses of their own. USER1 could thus easily make his data (for example, DBU1) available to USER2, for example, simply by telling USER2 what the network address—the link—is to DBU1. It would then not be necessary to upload the data into the host system again, since it would already be stored there. Even users, for example, USERx, who are not participating members in the data analysis system could then also access the data, given the network address and suitable authorization codes.

When any user has uploaded into his user region either all the data to be used in an analysis, or the links (addresses) to the data, or both, he may use any known method to indicate to the host system that data analysis should begin. For example, the user could "click" on a suitable icon on a display generated by his browser upon network connection to the host system; the analysis/decision support system 110 will then proceed to classify and analyze the data included and/or indicated in the respective user memory region.

In most cases it will be preferable to upload all the data to be analyzed into the memory of the host system, since data access during the analysis will then be much faster than the network transfer speed. This also makes the data readily accessible to other participating users. Thus, whenever the decision support system 110 of the host system is pointed by way of a link (for example, a network address) to a data base whose data has not already been retrieved into the host system memory (either into one of the user regions or into some other temporarily or permanently allocated storage region), then the host system preferably accesses the data base corresponding to the link and retrieves the data. This may be done, for example, when the user indicates that data analysis should begin, or in accordance with some other preparatory command for the host system to retrieve the data sets to be used in the later analysis.

Once the analysis/decision support system has completed its initial analysis of the data as described above, it will then have selected initial query devices, and will have the display data corresponding to the initial analysis, given the selected relevance measures, etc. This information, represented in FIG. 7 as QUERIES1 and RESULT1 for USER1 and QUERIES2 and RESULT2 for USER2, can then be transferred for display and adjustment to the respective user's systems 702, 704. This information could also be transferred for display to more than one user, so that these users may independently or collaboratively adjust the queries and see how the adjustment affects the displayed visualization of the relationships between the various data sets included in the analysis. Note that once an analysis has been completed, there is no need to redo it just because a query has been changed; rather, the results will be available for visualization even later, and as long as the structure (relevance measures) determined by the decision support module is not changed by the user, then the user can continue with his analysis by viewing the previously stored results (for example, RESULTS1) and adjusting the queries as normal.

According to another feature that may be included in this embodiment of the invention, the host system may also maintain a log of the actions taken by users with respect to any data analysis. In FIG. 7, a log is shown in each user memory, that is, LOG1, for USER1, LOG2 for USER2, etc. The log may contain, for example, the history of which user(s), which data, and which query states were included in a particular analysis, visualization or report, possibly with a copy of those results. In effect, the log could, as its name implies, be a record of the analysis history for any body of data. Another advantage of maintaining the logs, besides the obvious advantage that users can track their work over time, is that they would also enable audits. For example, pharmaceutical companies could make their logs available to regulatory authorities in order to validate the results of clinical studies.

In addition to, or instead of the logging feature, another feature that may be included in this embodiment of the invention is e-mail notification of any access or change of uploaded data in any user's memory region. Whenever data in any user's memory region is accessed or used by any user besides the one who originally uploaded the data into the host, then the host system would transmit a message to this effect as e-mail, via the network, to the original user, preferably with information identifying the user accessing the data. Such accesses could then also be logged in the user's memory region. This would not only increase the data security of the system, but it would also be useful for coordinating multiple analyses involving, at least in part, the same data.

This remote-hosting embodiment of the invention is particularly advantageous when more than one researcher wants to explore data, which may have been generated by any or all of them. It also allows them to link into even other externally generated data, as long as it is available in a known format via the network (for example, demographic or meteorological data often made available by governmental agencies), and thus explore possible relationships with data gathered from outside their own research team. Results (in particular, display data that visualize an especially interesting relationship) can also be sent, for example, as an attachment in any conventional format to e-mail generated and transferred in the conventional manner by the e-mail module 730, to anyone who is able to access the network and who has a browser or similar software that is able to receive and display the data.

The automatic data classification and analysis method described above is of course the preferred method carried out by the analysis/decision support system 110, since its advantages are just as beneficial in this remotely hosted embodiment of the invention as in any other. Indeed, it is particularly advantageous in this embodiment, since users may submit for analysis data from several different sources, so that it will often be especially difficult for the user to know ahead of time what postulated relationships (relevance measures) are most likely to yield interesting and perhaps even surprising results.

On the other hand, the main feature of this embodiment of the invention is that one or more users can upload data for analysis into the host system, which carries out the actual analysis; the host system thus acts as a network portal and needs only to be able to access the uploaded user-specified data to be included in the analysis. As such, this embodiment of the invention does not presuppose any particular analysis routine. The analysis method described above, with automatic selection of relevance measures and/or even query devices, is preferred because of its flexibility and ability to so effectively make it possible for users to visualize and even discover relationships about the data.

Rather, the analysis/decision support system 110 could implement a particular, pre-determined analysis routine, or a library of possible analysis and visualization methods (for example, linear regression, polynomial, trigonometric or similar data-fitting algorithms, neural networks with predetermined initial structures, etc.). Along with submitting data for analysis, the user could then also select which of the analysis routines should be applied, for example, by selecting it from a browser-displayed pull-down menu. Of course, as is mentioned above, this feature may be needed in certain applications, such as clinical drug trials, in which the measure of relevance is prescribed.

The analysis/decision support module could, for example, also implement conventional text-based (for example, keyword-driven) querying and reporting, or multi-dimensional, hierarchical data analysis and visualization. The user could, for example, then, after or in conjunction with uploading data into the host system, upload text queries and view results as in conventional systems, except that, using this embodiment of the invention, the data being analyzed will have been uploaded from one or more users into the host portal.

Because this remote-hosting embodiment of the invention is not dependent on any particular analysis routine, it is also not limited to any particular data structure. Using the preferred analysis routine, with automatic selection of relevance measures and initial query devices, data in the data bases will typically be organized into records, with each record including at least one field. The actual data structure used to organize the data uploaded into the host system will, however, depend on which type of analysis routine is to be invoked for the analysis. If the data is to be used for conventional text-based searching, then the data structure can be a simple one-dimensional list. In general, for any n-dimensional analysis, visualization, text-based report, etc., the data should typically be able to be classified into at least a corresponding number n of different sets that can be compared using some measure of relevance.

What is claimed is:

1. A method for processing data from at least one data base, in which each data base contains a plurality of records and each record includes a plurality of data fields, and each field contains field data, has a field name and one of a plurality of data types, comprising the following steps:

receiving into a host system, via a network, the data from the at least one data base from at least one participating remote user system that is separate from the host system, in the host system, upon receipt of a request for initiation from the remote user system, analyzing the data from the at least one data base according to an analysis routine and generating analysis results;

in the host system, generating a representation of the analysis results; and transferring the representation of the analysis results via the network for display on at least one participating remote user system;

in a decision support module in the host system, automatically selecting an initial, adjustable, graphical query device as a function of and adapted to a type and range of the corresponding field data;

transferring each graphical query device via the network to at least one participating user system;

sensing, via the network, adjustment by the user of each participating user system to which each graphical query device has been transferred of any of the displayed, adjustable, graphical query devices; and in the host system, updating the representation of the analysis results corresponding to the sensed adjustments of any of the query devices, thereby enabling interactive visualization of the analysis results of the data via the network.

2. A method as in claim 1, in which at least one of the user systems to which graphical query devices are transferred is one of the participating user systems other than the participating source user system.

3. A method as in claim 1, further including the step of allocating, for each participating user system, a corresponding memory region in the host system, each memory region storing:

data from the at least one data base transferred via the network from the respective participating user system to the host system; and a log of accesses to the data stored in the respective memory regions.

4. A method as in claim 1, further including the step of notifying, via the network, each user whose corresponding data, stored in the respective memory region, is accessed by any other participating user.

5. A method for processing and visualizing data from at least one data base, in which each data base contains a plurality of records and each record includes a plurality of data fields that include field data, comprising the following steps:

receiving in a host system, via a network, from at least one remote participating user system separate from the host system, the data from the at least one data base;

in the host system, upon receipt of a request for initiation from the remote user system, analyzing the data from the at least one data base by detecting a relational structure between the data fields by calculating a respective relevance measure for each of the data fields, the relevance measure being a data type-dependent function indicating a measure of relational closeness between data in at least one of the data fields of the plurality of records to data in at least one other of the data fields of the plurality of records;

in the host system, generating a graphical representation of the relational structure;

transferring the graphical representation of the relational structure via the network for display on at least one participating user system;

for each of the data fields, in a decision support module in the host system, automatically selecting an initial, adjustable, graphical query device as a function of and adapted to the type and range of the corresponding field data;

transferring each graphical query device via the network to at least one participating user system;

sensing, via the network, adjustment by the user of each participating user system to which each graphical query device has been transferred of any of the displayed, adjustable, graphical query devices; and in the host system, updating the graphical representations of the relational structures corresponding to the sensed adjustments of any of the query devices, thereby enabling interactive visualization of the relational structures of the data fields via the network.

6. A method as in claim 5, which at least one of the user systems to which graphical query devices are transferred is one of the remote participating user systems other than the initiating, participating source user system.

* * * * *